(12) United States Patent  (10) Patent No.: US 7,405,885 B2
Kang et al.  (45) Date of Patent: Jul. 29, 2008

(54) ZOOM LENS (75) Inventors: Yi-Hao Kang, Hsinchu (TW); Yi-Tien Lu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/833,700

(22) Filed: Aug. 3, 2007

(65) Prior Publication Data

US 2008/0106801 A1    May 8, 2008

(30) Foreign Application Priority Data

Nov. 2, 2006   (TW) .............................. 95140535 A (51) Int. Cl.
*G02B 15/14* (2006.01)

(52) U.S. Cl. ...................................... 359/681; 359/691
(58) Field of Classification Search ......... 359/680–682, 359/691
See application file for complete search history.

(56) References Cited

U.S. PATENT DOCUMENTS

| 4,189,212 A | 2/1980 | Mizutani et al. |
| 4,380,375 A | 4/1983 | Mogami |
| 4,484,799 A | 11/1984 | Doi et al. |
| 5,076,677 A | 12/1991 | Sato |
| 6,809,882 B2 * | 10/2004 | Takatsuki ................... 359/691 |

* cited by examiner

*Primary Examiner*—Scott J Sugarman
(74) *Attorney, Agent, or Firm*—J.C. Patents (57) ABSTRACT A zoom lens includes a first lens group with a negative refractive power and a second lens group with a positive refractive power. The first lens group includes a first lens, a second lens, a third lens and a fourth lens arranged in sequence and refractive powers thereof are negative, negative, negative and positive respectively. The first and second lenses are meniscus lenses and two surfaces of the second lens are aspheric surfaces. The third lens is a biconcave lens and the fourth lens is a biconvex lens. The second lens group includes a fifth lens, a sixth lens, a seventh lens, an eighth lens and a ninth lens arranged in sequence and refractive powers thereof are positive, positive, positive, negative and positive respectively. A cemented doublet lens is composed of the seventh and eighth lenses. The ninth lens is a biconvex lens.

13 Claims, 5 Drawing Sheets

ZOOM LENS

CROSS-REFERENCE TO RELATED APPLICATION

This application claims the priority benefit of Taiwan application serial no. 95140535, filed on Nov. 2, 2006. All disclosure of the Taiwan application is incorporated herein by reference.

BACKGROUND OF THE INVENTION

1. Field of the Invention

The present invention relates to a lens, and more particularly to a zoom lens.

2. Description of Related Art

To attain the advantages of wide angle and small size, a zoom lens is normally designed to have two lens groups in the conventional technique. A first lens group, which is closer to an object side, has a negative refractive power and a second lens group has a positive refractive power. In other words, the first lens group is used for diverging light beams and the second lens group is used for converging light beams.

However, an f-number of the conventional wide-angle zoom lens comprising two lens groups is greater than 3.5. Hence, it is difficult to reach a large relative aperture. In addition, eliminating distortion is difficult while this type of zoom lens is in a wide-end disposition. The conventional technique usually relies on two methods for minimizing the distortion. One of the methods includes distancing the positive lens in the first lens group or the negative lens in the second lens group away from the aperture stop. However, this method not only increases the dimension of the first lens group or the second lens group, but overall length of the zoom lens also increases as well so that it is harder to form a compact structure. The other method is to increase the refractive power of the positive lens in the first lens group or the negative lens in the second lens group. If the refractive power of the positive lens in the first lens group is increased, the refractive power of the other negative lenses in the first lens group must be increased. Hence, high-level distortion aberration and coma aberration is produced leading to a deterioration of overall image quality. A similar condition occurs when the refractive power of the negative lens in the second lens group is increased.

SUMMARY OF THE INVENTION

Accordingly, the present invention is related to a zoom lens for improving image quality.

To achieve these and other advantages, as embodied and broadly described herein, the invention provides a zoom lens including a first lens group with a negative refractive power and a second lens group with a positive refractive power. The first lens group includes a first lens, a second lens, a third lens and a fourth lens arranged from an object side to an image side in sequence and refractive powers thereof are negative, negative, negative and positive respectively. The first and second lenses are meniscus lenses with their convex surfaces facing the object side and the two surfaces of the second lens are aspheric surfaces. The third lens is a biconcave lens and the fourth lens is a biconvex lens. The second lens group is disposed between the first lens group and the image side, and the first lens group and the second lens group are suitable for moving between the object side and the image side. The second lens group includes a fifth lens, a sixth lens, a seventh lens, an eighth lens and a ninth lens arranged from the object side to the image side in sequence and refractive powers thereof are positive, positive, positive, negative and positive respectively. A cemented doublet lens with a convex surface facing the object side is composed of the seventh and eighth lenses. The ninth lens is a biconvex lens.

The present invention also provides a zoom lens including a first lens group with a negative refractive power and a second lens group with a positive refractive power. The first lens group includes a first lens, a second lens, a third lens and a fourth lens arranged from an object side to an image side in sequence and refractive powers thereof are negative, negative, negative and positive respectively. The first and second lenses are meniscus lenses with their convex surfaces facing the object side and the two surfaces of the second lens are aspheric surfaces. The third lens is a biconcave lens and the fourth lens is a biconvex lens. The second lens group is disposed between the first lens group and the image side, and the first lens group and the second lens group are suitable for moving between the object side and the image side. Furthermore, a focal length of the first lens group is $F_1$, and focal lengths of the second lens and the third lens are $F_{L2}$ and $F_{L3}$ respectively. Moreover, $7<F_{L2}/F_1<13$, $0.5<F_{L3}/F_1<1.5$.

Other objectives, features and advantages of the present invention will be further understood from the further technology features disclosed by the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
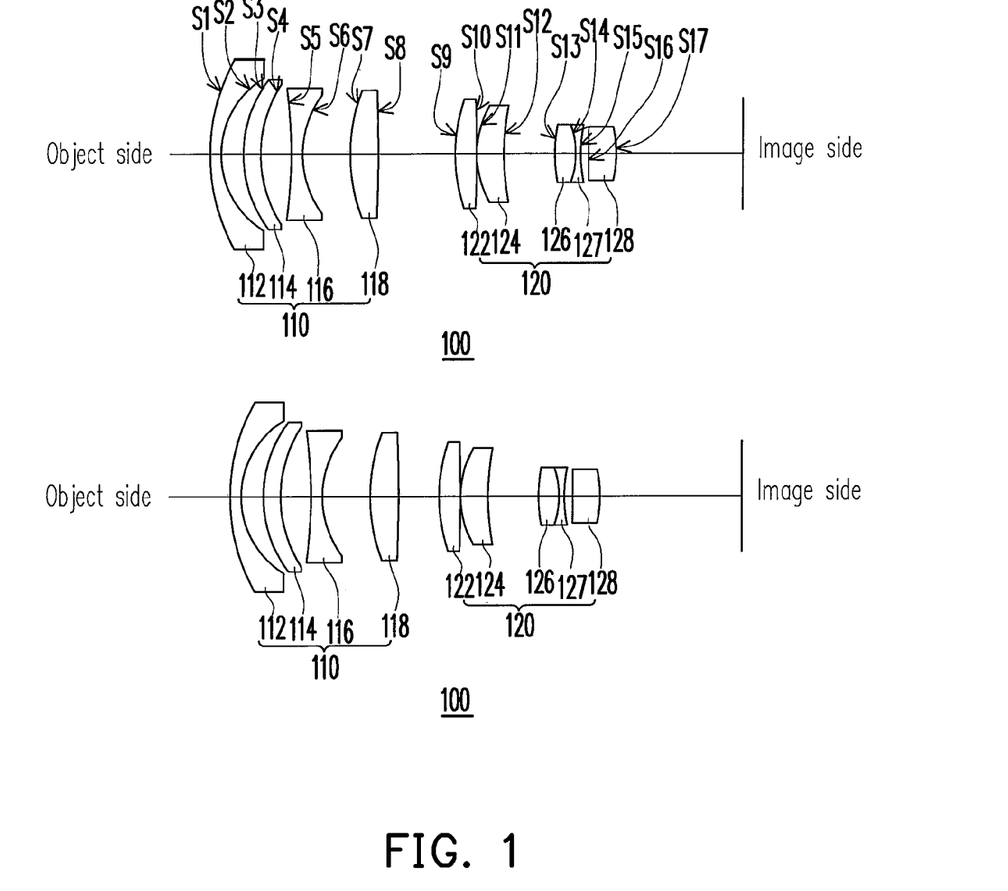
FIG. 1 is two diagrams of a zoom lens in a wide-end disposition and a tele-end disposition according to one embodiment of the present invention.

FIG. 1 is a diagram of a zoom lens in a wide-end disposition and a tele-end disposition according to one embodiment of the present invention. The upper half of FIG. 1 shows the zoom lens in the wide-end disposition and the lower half of FIG. 1 shows the zoom lens in the tele-end disposition. As shown in FIG. 1, the zoom lens 100 in the present embodiment includes a first lens group 110 with a negative refraction power and a second lens group 120 with a positive refraction power. The first lens group 110 includes a first lens 112, a second lens 114, a third lens 116 and a fourth lens 118 arranged from an object side to an image side in sequence and refractive powers thereof are negative, negative, negative and positive respectively. The first lens 112 and the second lens 114 are meniscus lenses with their convex surfaces facing the object side and two surfaces S3, S4 of the second lens 114 are aspheric surfaces. The third lens 116 is a biconcave lens and the fourth lens 118 is a biconvex lens. In addition, the second lens group 120 is disposed between the first lens group 110 and the image side.

The second lens group 120 includes a fifth lens 122, a sixth lens 124, a seventh lens 126, an eighth lens 127 and a ninth lens 128 arranged from the object side to the image side in sequence and refractive powers thereof are positive, positive, positive, negative and positive respectively. The fifth lens 122 is a biconvex lens and the sixth lens 124 is a meniscus lens with a convex surface facing the object side, for example. A cemented doublet lens with a convex surface facing the object side is composed of the seventh lens 126 and the eighth lens 127, and the ninth lens 128 is a biconvex lens.

In the foregoing zoom lens 100, the first lens group 110 and the second lens group 120 are suitable for moving between the object side and the image side. More specifically, when the magnification of the zoom lens 100 needs to be changed from the wide-end to the tele-end, the first lens group 110 and the second lens group 120 are moved toward each other. On the other hand, when the magnification of the zoom lens 100 needs to be changed from the tele-end to the wide-end, the first lens group 110 and the second lens group 120 are moved away from each other. In addition, the zoom lens 100 further includes an aperture stop (not shown) disposed in the second lens group 120. For example, the aperture stop is disposed on a surface S15 of the eighth lens 127 facing the ninth lens 128.

In the present embodiment, because the first lens group 110 has negative refractive power and the second lens group 120 has positive refractive power and the second lens 114 has two aspheric surfaces, distortion aberration of the zoom lens 100 is effectively reduced. Hence, a good imaging quality is maintained in the process of changing the magnification of the zoom lens 100. Furthermore, the present embodiment does not use any one of the two conventional methods for reducing the distortion aberration so that high-level distortion aberration and coma aberration are avoided. Thus, the zoom lens 100 has a compact structure. In addition, by disposing an aperture stop in the second lens group 120, distortion aberration resulted form the zooming process is minimized and the length of the zoom lens 100 is effectively reduced. As a result, the zoom lens 100 has a more compact structure.

To ensure the imaging quality, the zoom lens 100 is designed to satisfy the following conditions: (1) $7<F_{L2}/F_1<13$; (2) $0.5<F_{L3}/F_1<1.5$, wherein $F_1$ is a focal length of the first lens group 110, and $F_{L2}$ and $F_{L3}$ are focal lengths of the second lens 114 and the third lens 116 respectively. In addition, to ensure the imaging quality, the zoom lens 100 is also designed to satisfy the following conditions: (1) $1<|F_1|/F_W<2$; (2) $0.8<F_2/|F_1|<1.3$ wherein $F_1$ and $F_2$ are focal lengths of the first lens group 110 and the second lens group 120 respectively, and $F_W$ is focal length when the zoom lens 100 is in wide-end disposition.

In the present embodiment, refractive indexes, thickness and Abbe numbers of the seventh lens 126 and the eighth lens 127 is also constrained to ensure the imaging quality of the zoom lens 100. More specifically, the zoom lens 100 in the present embodiment is designed to satisfy the following conditions: (1) $0.2 \leq n_8-n_7<0.4$; (2) $d_7>d_8$; (3) $45<v_7-v_8<65$. Here, $n_7$ and $n_8$ are the refractive indexes of the seventh lens 126 and the eighth lens 127 with respect to the d line (light having a wavelength 587.6 nm), $d_7$ and $d_8$ are the central thickness of the seventh lens 126 and the eighth lens 127, and $v_7$ and $v_8$ are the Abbe numbers of the seventh lens 126 and the eighth lens 127.

In the following, a preferred embodiment of the zoom lens 100 is described. However, the data listed in the following should not be used to limit the present invention. Any one skilled in the art may easily perform a suitable modification of the parameters or settings after referring to the present invention. Yet, with modifications or not, it is still considered to be within the scope of the present invention.

TABLE 1

| Surface | Radius of Curvature (mm) | Interval (mm) | Refractive Index | Abbe Number | Remarks |
|---------|--------------------------|---------------|------------------|-------------|---------|
| S1 | 47.707 | 2.37 | 1.59486 | 57.7 | First lens |
| S2 | 18.921 | 4.97 | | | |
| S3 | 46.578 | 3.56 | 1.52528 | 56.0 | Second lens |
| S4 | 33.037 | 5.57 | | | |
| S5 | −100.242 | 1.80 | 1.59486 | 57.7 | Third lens |
| S6 | 21.401 | 8.64 | | | |
| S7 | 36.788 | 5.34 | 1.56530 | 35.7 | Fourth lens |
| S8 | −391.646 | Variable interval (d1) | | | |
| S9 | 58.191 | 4.17 | 1.59486 | 57.7 | Fifth lens |
| S10 | −146.889 | 1.98 | | | |
| S11 | 26.905 | 5.43 | 1.69680 | 55.5 | Sixth lens |
| S12 | 73.016 | 7.77 | | | |
| S13 | 20.318 | 4.24 | 1.49700 | 81.6 | Seventh lens |
| S14 | −16.562 | 0.79 | 1.80795 | 24.9 | Eighth lens |
| S15 | 19.005 | 1.41 | | | Aperture stop |
| S16 | 75.176 | 5.60 | 1.78472 | 25.7 | Ninth lens |
| S17 | −21.694 | Variable interval (d2) | | | |

In table 1, the radius of curvature refers to the radius of curvature of each surface, the interval refers to the distance between two neighboring surfaces. For example, the interval of surface S1 is the distance between the surface S1 and the surface S2. The values of the thickness, refractive index and Abbe number corresponding to the various lenses in the remark field refer to the interval, refractive index and Abbe number in the same row. In addition, in table 1, the surfaces S1 and S2 are the surfaces of the first lens 112 away from and close to the second lens 114, the surfaces S3 and S4 are the surfaces of the second lens 114 away from and close to the third lens 116, the surfaces S5 and S6 are the surfaces of the third lens 116 away from and close to the fourth lens 118, the surfaces S7 and S8 are the surfaces of the fourth lens 118 away from and close to the fifth lens 122, the surfaces S9 and S10 are the surfaces of the fifth lens 122 away from and close to the sixth lens 124, the surfaces S11 and S12 are the surfaces of the sixth lens 124 away from and close to the seventh lens 126, the surfaces S13 is the surface of the seventh lens 126 away from the eight lens 127, the surface S14 is the junction interface between the seventh lens 126 and the eighth lens 127, the surface S15 is the surface of the eighth lens 127 close to the ninth lens 128 and the aperture stop is disposed on the surface S15, the surfaces S16 and S17 are the surfaces of the ninth lens 128 close to and away from the eighth lens 127.

In addition, the surfaces S3 and S4 are aspheric surface, and the formula for aspheric surface is as follows:

$$X = \frac{(1/R)H^2}{1+\sqrt{1-(1+K)(H/R)^2}} + AH^4 + BH^6 + CH^8 + DH^{10}$$

wherein, X is offset in the optical axis direction. R is the radius of the osculating sphere, that is, the radius of curvature close to the optical axis (the radius of curvature of surfaces S3, S4 in the table). K is the conic constant. H is the aspheric surface height, that is, the height from the center of the lens to its edge. According to the formula, different heights H correspond to different X value. A, B, C, D are aspheric coefficients. The aspheric coefficients A, B, C, D and the K value of the surfaces S3 and S4 are listed in Table 2 below:

TABLE 2

| Surface | K | A | B | C | D |
|---|---|---|---|---|---|
| S3 | 1.2289 | 4.22696E−05 | −1.01735E−07 | 4.38745E−10 | −4.02123−13 |
| S4 | 0.7529 | 3.93653E−05 | −2.04936E−07 | 1.00071E−09 | −2.22273E−12 |

TABLE 3

|  | Wide-End | Tele-End |
|---|---|---|
| Effective Focal Length (EFL) | 15.24 | 16.80 |
| Field of View (FOV) | 71.76 | 66.56 |
| f-number | 2.8 | 2.95 |
| Variable Interval (mm) | | |
| d1 | 15.23 | 10.1 |
| d2 | 25.30 | 26.91 |

In table 3, a few important parameters including the effective focal length (EFL), the field of view (FOV), the f-number and the variable interval of the surfaces S8 and S17 of the zoom lens 100 in the wide-end disposition and the tele-end disposition are listed. In addition, in this preferred embodiment, $|F_1|/F_W=1.880$, $F_{L2}/F_1=7.675$, $F_{L3}/F_1=1.108$, $F_2/|F_1|=1.027$, $n_8-n_7=0.31$, $v_7-v_8=56.7$. It should be noted that the f-number of the zoom lens 100 in the present embodiment could be smaller than 2.8 compared with the conventional technique. Hence, the relative aperture is larger.

Figure 2A:
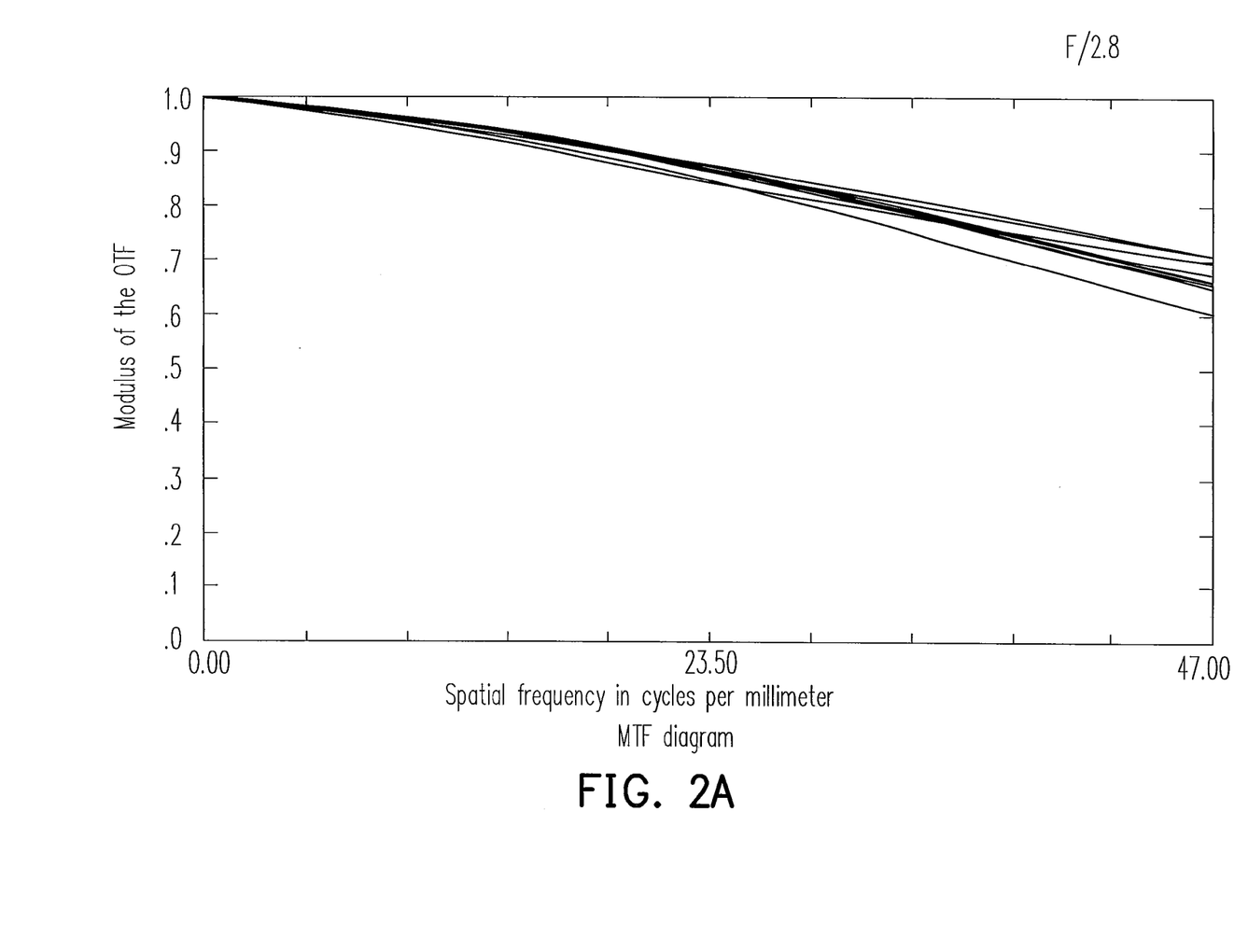
FIGS. 2A through 2C are graphic diagrams showing the optical imaging simulation results of a zoom lens in a wide-end disposition.
Figure 2B:
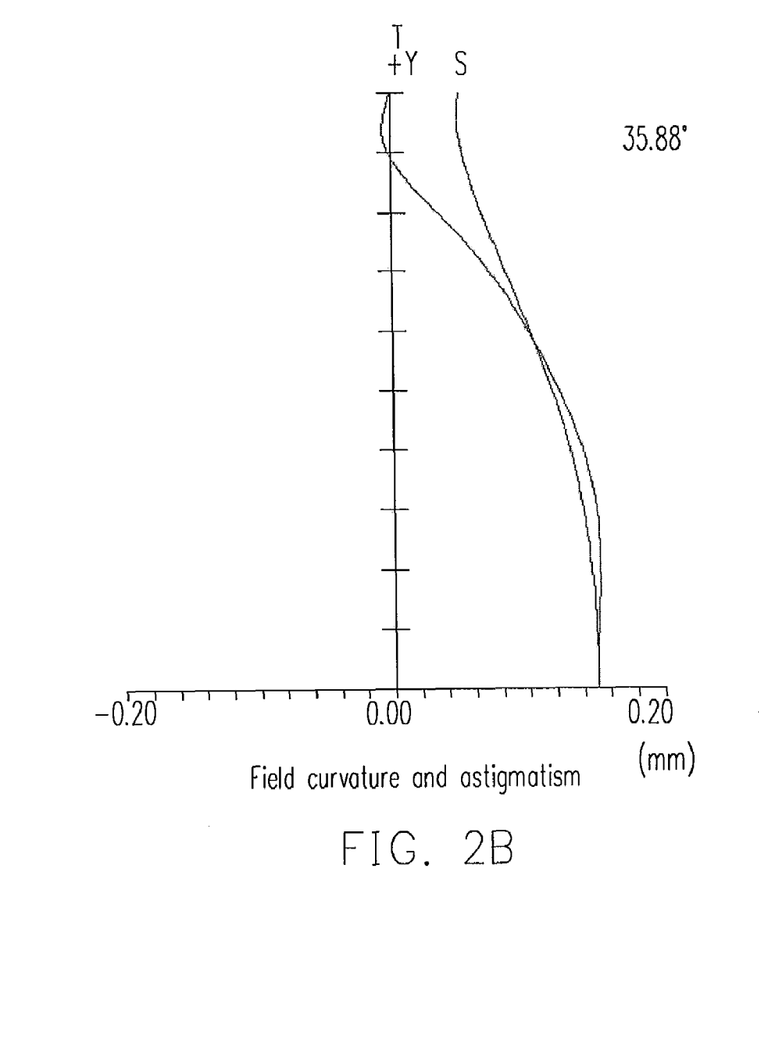
Figure 2C:
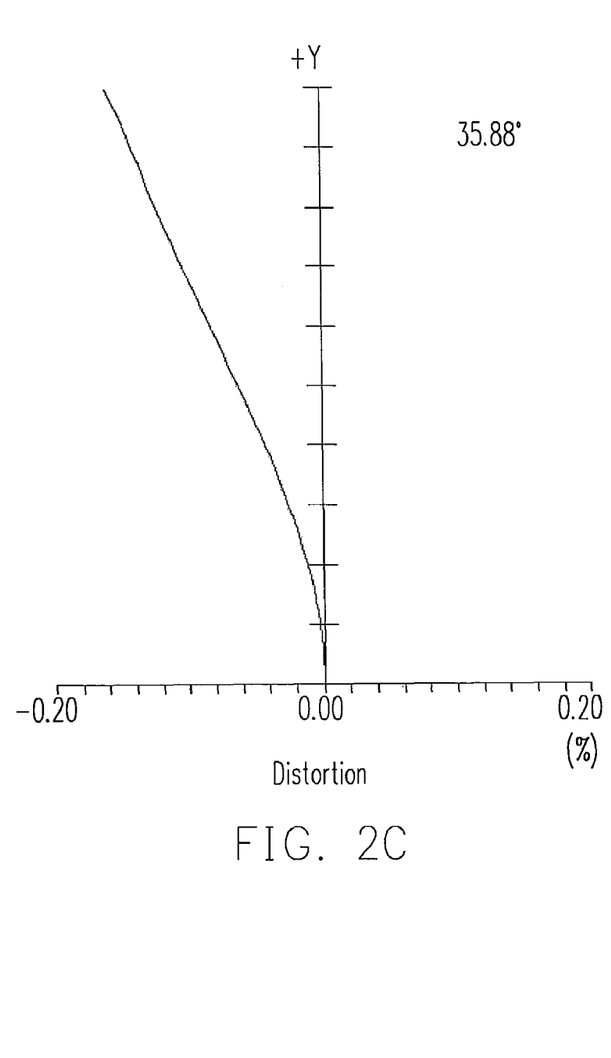
Figure 3A:
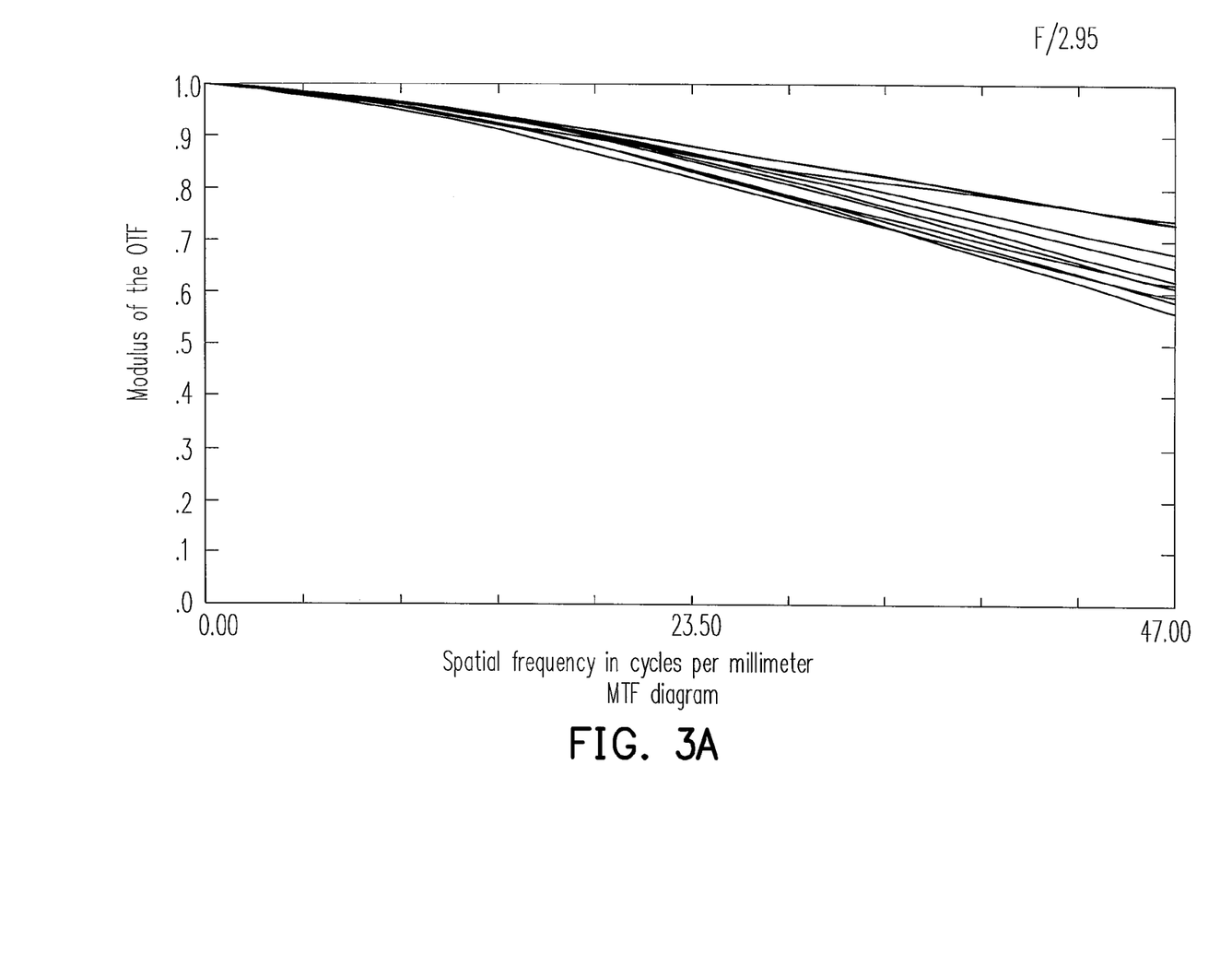
FIGS. 3A through 3C are graphic diagrams showing the of optical imaging simulation results of a zoom lens in a tele-end disposition.
Figure 3B:
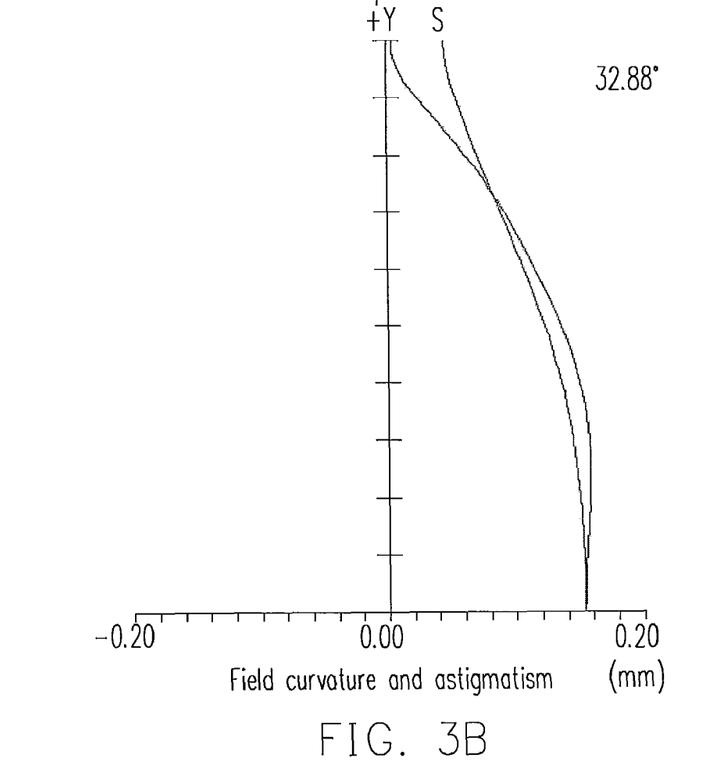
Figure 3C:
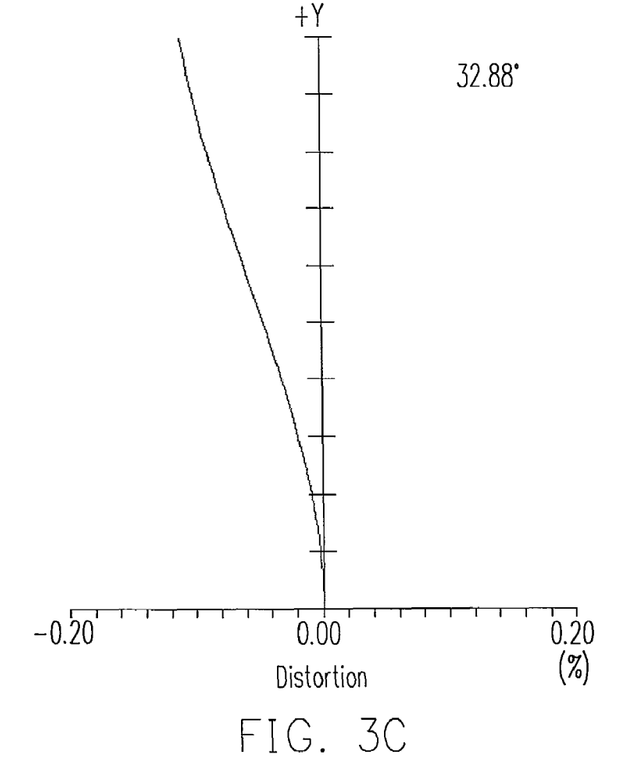

FIGS. 2A and 3A are modulation transfer functions (MTF) with the abscissa representing spatial frequency in cycles per millimeter and the ordinate representing modulus of the OTF. FIGS. 2B and 3B are field curvature and astigmatism diagrams and FIGS. 2C and 3C are distortion diagrams. According to the diagrams from FIGS. 2A through 3C, regardless of whether the zoom lens 100 is in the wide-end disposition or the tele-end disposition, the simulated results of the MTF, field curvature and astigmatism, and distortion all fall within the standard range. Therefore, the zoom lens 100 in the present invention has improved imaging quality.

In the following, three preferred embodiments of the zoom lens 100 are described. Tables 4 through 6 list the data of an embodiment, tables 7 through 9 list another embodiment, and tables 10 through 12 list yet another embodiment. In addition, the meanings of the symbols in Tables 4 through 12 are identical to the ones in Tables 1 through 3 and hence a detailed description is omitted. It should be noted that the data listed for illustrating the following embodiments by no means restrict the present invention. Any one skilled in the art may easily perform a suitable modification of the parameters or settings after referring to the present invention, and yet it is still considered to be within the scope of the present invention.

TABLE 4

| Surface | Radius of Curvature (mm) | Interval | Refractive Index | Abbe Number | Remarks |
|---|---|---|---|---|---|
| S1 | 52.285 | 2.37 | 1.59174 | 62.8 | First lens |
| S2 | 18.656 | 5.51 | | | |
| S3 | 47.517 | 3.56 | 1.52528 | 56.0 | Second lens |
| S4 | 32.863 | 5.15 | | | |
| SS | −150.616 | 1.80 | 1.59174 | 62.8 | Third lens |
| S6 | 21.641 | 8.70 | | | |
| S7 | 37.201 | 5.34 | 1.58144 | 40.9 | Fourth lens |
| S8 | −689.907 | Variable interval (d3) | | | |
| S9 | 58.491 | 4.17 | 1.59174 | 62.8 | Fifth lens |
| S10 | −152.104 | 1.20 | | | |
| S11 | 27.388 | 5.43 | 1.69726 | 54.4 | Sixth lens |
| S12 | 73.083 | 9.90 | | | |
| S13 | 20.050 | 4.24 | 1.49700 | 81.6 | Seventh lens |
| S14 | −16.522 | 0.79 | 1.80518 | 25.5 | Eighth lens |
| S15 | 19.200 | 1.18 | | | Aperture stop |
| S16 | 76.466 | 5.60 | 1.78862 | 25.8 | Ninth lens |
| S17 | −21.886 | Variable interval (d4) | | | |

TABLE 5

| Surface | K | A | B | C | D |
|---|---|---|---|---|---|
| S3 | 1.5146 | 3.40018E−05 | −3.77320E−08 | 2.10226E−10 | −2.09799E−13 |
| S4 | 0.4979 | 2.79154E−05 | −8.11560E−08 | 3.68136E−10 | −1.19975E−12 |

TABLE 6

|  | Wide-End | Tele-End |
|---|---|---|
| Effective Focal Length (EFL) | 15.24 | 16.80 |
| Field of View (FOV) | 71.77 | 66.54 |
| f-number | 2.8 | 2.96 |
| Variable Interval (mm) | | |
| d3 | 15.23 | 10.1 |
| d4 | 25.30 | 26.91 |

In addition, in the preferred embodiment, $|F_1|/F_W=1.878$, $F_{L2}/F_1=10.040$, $F_{L3}/F_1=0.993$, $F_2/|F_1|=1.027$, $n_8-n_7=0.31$, $v_7-v_8=56.1$.

TABLE 7

| Surface | Radius of Curvature (mm) | Interval | Refractive Index | Abbe Number | Remarks |
|---|---|---|---|---|---|
| S1 | 48.568 | 2.37 | 1.59661 | 61.9 | First lens |
| S2 | 18.359 | 4.11 | | | |
| S3 | 48.083 | 3.56 | 1.52528 | 56.0 | Second lens |
| S4 | 33.869 | 4.88 | | | |
| S5 | −102.915 | 1.80 | 1.59661 | 61.9 | Third lens |
| S6 | 22.182 | 9.02 | | | |
| S7 | 39.868 | 5.34 | 1.57338 | 40.0 | Fourth lens |
| S8 | −282.325 | Variable interval (d5) | | | |
| S9 | 49.311 | 4.17 | 1.59661 | 61.9 | Fifth lens |
| S10 | −452.579 | 5.39 | | | |
| S11 | 25.883 | 5.43 | 1.72881 | 58.7 | Sixth lens |
| S12 | 65.339 | 6.68 | | | |
| S13 | 18.325 | 4.24 | 1.50571 | 81.6 | Seventh lens |
| S14 | −17.404 | 0.79 | 1.80273 | 25.5 | Eighth lens |
| S15 | 18.111 | 0.65 | | | Aperture stop |
| S16 | 85.909 | 5.60 | 1.79870 | 23.4 | Ninth lens |
| S17 | −23.659 | Variable interval (d6) | | | |

TABLE 8

| Surface | K | A | B | C | D |
|---|---|---|---|---|---|
| S3 | 0.7506 | 4.22210E−05 | −1.01379E−07 | 4.38423E−10 | −4.11548E−13 |
| S4 | 0.2549 | 3.94220E−05 | −2.05382E−07 | 9.98972E−10 | −2.22869E−12 |

TABLE 9

|  | Wide-End | Tele-End |
|---|---|---|
| Effective Focal Length (EFL) | 15.24 | 16.80 |
| Field of View (FOV) | 71.76 | 66.56 |
| f-number | 2.8 | 2.99 |
| Variable Interval (mm) | | |
| d5 | 15.23 | 10.1 |
| d6 | 25.30 | 26.91 |

In addition, in the preferred embodiment, $|F_1|/F_W=1.881$, $F_{L2}/F_1=8.292$, $F_{L3}/F_1=1.057$, $F_2/|F_1|=1.020$, $n_8-n_7=0.31$, $v_7-v_8=56.1$.

TABLE 10

| Surface | Radius of Curvature (mm) | Interval | Refractive Index | Abbe Number | Remarks |
|---|---|---|---|---|---|
| S1 | 48.543 | 2.37 | 1.59820 | 64.7 | First lens |
| S2 | 18.357 | 3.98 | | | |
| S3 | 48.175 | 3.56 | 1.52528 | 56.0 | Second lens |
| S4 | 33.874 | 4.80 | | | |
| S5 | −103.345 | 1.80 | 1.59820 | 64.7 | Third lens |
| S6 | 22.188 | 9.00 | | | |
| S7 | 40.193 | 5.34 | 1.57361 | 41.0 | Fourth lens |
| S8 | −267.289 | Variable interval (d7) | | | |
| S9 | 48.604 | 4.17 | 1.59820 | 64.7 | Fifth lens |
| S10 | −527.823 | 5.69 | | | |
| S11 | 25.946 | 5.43 | 1.72911 | 60.0 | Sixth lens |
| S12 | 65.695 | 6.60 | | | |
| S13 | 18.298 | 4.24 | 1.50579 | 81.6 | Seventh lens |
| S14 | −17.417 | 0.79 | 1.80269 | 25.5 | Eighth lens |
| S15 | 18.115 | 0.65 | | | Aperture stop |
| S16 | 85.823 | 5.60 | 1.79918 | 23.0 | Ninth lens |
| S17 | −23.656 | Variable interval (d8) | | | |

TABLE 11

| Surfaces | K | A | B | C | D |
|---|---|---|---|---|---|
| S3 | 0.6896 | 4.20255E−05 | −1.06127E−07 | 4.67484E−10 | −4.99927E−13 |
| S4 | 0.1841 | 3.86110E−05 | −2.02675E−07 | 9.76649E−10 | −2.21753E−12 |

TABLE 12

| | Wide-End | Tele-End |
|---|---|---|
| Effective Focal Length (EFL) | 15.24 | 16.80 |
| Field of View (FOV) | 71.81 | 66.58 |
| f-number | 2.8 | 2.99 |
| Variable Interval (mm) | | |
| d7 | 15.23 | 10.1 |
| d8 | 25.30 | 26.91 |

In addition, in the preferred embodiment, $|F_1|/F_W=1.880$, $F_{L2}/F_1=8.268$, $F_{L3}/F_1=1.057$, $F_2/|F_1|=1.023$, $n_8-n_7=0.32$, $v_7-v_8=56.1$.

In summary, the zoom lens of the present invention has at least one or more of the following advantages:

1. Because an assembly comprising the first lens group with the negative refractive power and the second lens group with the positive refractive power is used and the second lens has two aspheric surfaces, distortion aberration is effectively reduced. Therefore, the zoom lens has good imaging quality.

2. By setting an aperture stop in the second lens group, length of the zoom lens is effectively reduced so that the zoom lens has a more compact structure.

3. The f-number of the zoom lens in the present invention is as low as 2.8 and yet good imaging quality is maintained.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
a first lens group with a negative refractive power, comprising a first lens, a second lens, a third lens and a fourth lens arranged from an object side to an image side in sequence and refractive powers thereof being negative, negative, negative and positive respectively, wherein the first and second lenses are meniscus lenses with their convex surfaces facing the object side and two surfaces of the second lens are aspheric surfaces, the third lens is a biconcave lens and the fourth lens is a biconvex lens; and
a second lens group with a positive refractive power, disposed between the first lens group and the image side, the second lens group comprising a fifth lens, a sixth lens, a seventh lens, an eighth lens and a ninth lens arranged from the object side to the image side in sequence and refractive powers thereof being positive, positive, positive, negative and positive respectively, wherein a cemented doublet lens with a convex surface facing the object side is composed of the seventh and eighth lenses, and the ninth lens is a biconvex lens,
wherein the first lens group and the second lens group are suitable for moving between the object side and the image side.

2. The zoom lens of claim 1, further satisfying the following conditions:

$1<|F_1|/F_W<2$; and $0.8<F_2/|F_1|<1.3$;

wherein $F_1$ and $F_2$ are focal lengths of the first lens group and the second lens group and $F_W$ is a focal length of the zoom lens in a wide-end disposition.

3. The zoom lens of claim 1, further satisfying the following conditions:

$0.2 \leq n_8-n_7 \leq 0.4$;

$d_7>d_8$; and $45 \leq v_7-v_8<65$;

wherein $n_7$ and $n_8$ are refractive indexes of the seventh lens and the eighth lens with respect to the d line, $d_7$ and $d_8$ are central thickness of the seventh lens and the eighth lens, and $v_7$ and $v_8$ are Abbe numbers of the seventh lens and the eighth lens.

4. The zoom lens of claim 1, further comprising an aperture stop disposed in the second lens group.

5. The zoom lens of claim 4, wherein the aperture stop is disposed on a surface of the eighth lens and the surface faces the ninth lens.

6. The zoom lens of claim 1, wherein the first lens group are composed of the first lens, the second lens, the third lens and the fourth lens and the second lens group are composed of the fifth lens, the sixth lens, the seventh lens, the eighth lens and the ninth lens.

7. A zoom lens, comprising:
a first lens group with a negative refractive power, the first lens group comprising a first lens, a second lens, a third lens and a fourth lens arranged from an object side to an image side in sequence and refractive powers thereof being negative, negative, negative and positive respectively, wherein the first and second lenses are meniscus lenses with their convex surfaces facing the object side and two surfaces of the second lens are aspheric surfaces, the third lens is a biconcave lens and the fourth lens is a biconvex lens; and
the second lens group with a positive refractive power, disposed between the first lens group and the image side, and the first lens group and the second lens group suitable for moving between the object side and the image side,
wherein the focal length of the first lens group is $F_1$, the focal lengths of the second lens and the third lens are $F_{L2}$ and $F_{L3}$, and $7<F_{L2}/F_1<13$, $0.5<F_{L3}/F_1<1.5$.

8. The zoom lens of claim 7, wherein the second lens group comprises a fifth lens, a sixth lens, a seventh lens, an eighth lens and a ninth lens arranged from the object side to the image side in sequence and refractive powers thereof are positive, positive, positive, negative and positive respectively, a cemented doublet lens with a convex surface facing the object side is composed of the seventh and eighth lenses, and the ninth lens is a biconvex lens.

9. The zoom lens of claim 8, wherein the first lens group is composed of the first lens, the second lens, the third lens and the fourth lens and the second lens group is composed of the fifth lens, the sixth lens, the seventh lens, the eighth lens and the ninth lens.

10. The zoom lens of claim 8, further satisfying the following conditions:

$$0.2 \leq n_8 - n_7 \leq 0.4;$$

$$d_7 > d_8; \text{ and}$$

$$45 < v_7 - v_8 < 65;$$

wherein $n_7$ and $n_8$ are the refractive indexes of the seventh lens and the eighth lens with respect to the d line, $d_7$ and $d_8$ are central thickness of the seventh lens and the eighth lens, and $v_7$ and $v_8$ are Abbe numbers of the seventh lens and the eighth lens.

11. The zoom lens of claim 8, further comprising an aperture stop disposed on a surface of the eighth lens and the surface faces the ninth lens.

12. The zoom lens of claim 7, further comprising an aperture stop disposed in the second lens group.

13. The zoom lens of claim 7, further satisfying the following conditions:

$$1 < |F_1|/F_W < 2; \text{ and}$$

$$0.8 < F_2/|F_1| < 1.3;$$

wherein $F_1$ and $F_2$ are focal lengths of the first lens group and the second lens group and $F_W$ is a focal length of the zoom lens in a wide-end disposition.

* * * * *